United States Patent
Bedekar et al.

(10) Patent No.: US 11,399,294 B2
(45) Date of Patent: Jul. 26, 2022

(54) INCREASING NUMBER OF CONNECTED USER EQUIPMENTS ON RADIO ACCESS NETWORK APPARATUS

(71) Applicant: Nokia Technologies Oy, Espoo (FI)

(72) Inventors: Anand Bedekar, Glenview, IL (US); Joseph Thaliath, Bangalore (IN); Prasanna Km, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/054,956

(22) PCT Filed: May 23, 2018

(86) PCT No.: PCT/EP2018/063486
§ 371 (c)(1),
(2) Date: Nov. 12, 2020

(87) PCT Pub. No.: WO2019/223861
PCT Pub. Date: Nov. 28, 2019

(65) Prior Publication Data
US 2021/0329475 A1    Oct. 21, 2021

(51) Int. Cl.
*H04W 24/02* (2009.01)
*H04W 88/08* (2009.01)
(Continued)

(52) U.S. Cl.
CPC ........... *H04W 24/02* (2013.01); *H04W 88/08* (2013.01); *H04W 88/18* (2013.01); *H04W 92/24* (2013.01)

(58) Field of Classification Search
CPC ..... H04W 24/02; H04W 88/00; H04W 88/02; H04W 88/08; H04W 88/18; H04W 92/24;
(Continued)

(56) References Cited

U.S. PATENT DOCUMENTS 9,277,480 B2   3/2016  Kohli
9,288,689 B2   3/2016  Lee et al.
(Continued)

FOREIGN PATENT DOCUMENTS

WO   2017/151025 A1   9/2017
WO   2017/211415 A1   12/2017

OTHER PUBLICATIONS

International Search Report and Written Opinion received for corresponding Patent Cooperation Treaty Application No. PCT/EP2018/063486, dated Feb. 28, 2019, 16 pages.
(Continued)

*Primary Examiner* — Meless N Zewdu
(74) *Attorney, Agent, or Firm* — Harrington & Smith

(57) ABSTRACT

In case a first set of N user equipments attached to a radio access network via an apparatus does not exceed a maximum number M, the apparatus performs (S41) real-time and non-real-time processing for the N user equipments. In case N exceeds M, the apparatus performs (S43) real-time and non-real-time processing for a second set of M user equipments contained within the first set and forwards non-real-time processing of a third set of N-M user equipments contained within the first set but not contained within the second set to a central unit which stores (S51) context information of the user equipments of the first set and performs (S53) non-real-time processing of the user equipments of the third set.

20 Claims, 4 Drawing Sheets

(51) Int. Cl.
*H04W 88/18* (2009.01)
*H04W 92/24* (2009.01)

(58) Field of Classification Search
CPC ........... H04W 4/18; H04W 8/20; H04W 8/22; H04W 8/24; H04W 8/245; H04W 36/0009; H04W 72/121; H04W 74/00; H04W 92/10; H04W 88/12; H04W 88/085; H04W 88/005; H04W 72/00; H04W 72/005; H04W 72/02; H04W 72/04; H04W 76/00; H04W 76/10; H04W 76/15; H04W 48/00; H04W 48/02; H04W 48/04; H04W 48/06; H04W 4/02; H04W 4/029; H04W 4/20; H04W 4/80; H04W 64/00; H04W 64/003; H04W 72/10; G01S 3/48; G01S 3/8006; G01S 5/011; G01S 5/017054; H04L 47/14; H04L 47/125; H04L 47/10

See application file for complete search history.

(56) References Cited

U.S. PATENT DOCUMENTS

| | | |
|---|---|---|
| 9,537,973 B2 | 1/2017 | Batrouni et al. |
| 2013/0163531 A1* | 6/2013 | Kim ..................... H04W 72/04 |
| 2014/0177600 A1* | 6/2014 | Tsai et al. ........... H04W 36/332 |
| 2016/0112944 A1* | 4/2016 | Zhou et al. ........... H04W 48/20 |
| 2018/0035350 A1* | 2/2018 | Rahman ................ H04W 36/32 |
| 2020/0145175 A1* | 5/2020 | Hassan Hussein et al. ................. H04L 5/14 |

OTHER PUBLICATIONS

"Draft GSTR-TN5G (for agreement)", SG 15-TD189r1/PLEN, Study Group 15, Rapporteurs, Jan. 29-Feb. 9, 2018, 13 pages.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

Rebecchi, Filippo, et al., "Data Offloading Techniques in Cellular Networks: A Survey", IEEE Communications Surveys & Tutorials, vol. 17, No. 2, Apr. 2015, pp. 1-25.

Li, Yang, et al., "What to Expect in Next Generation RAN Architecture: A Survey", 17th IEEE Inteernational Conference on Communication Technology, Oct. 27-30, 2017, pp. 427-431.

* cited by examiner

INCREASING NUMBER OF CONNECTED USER EQUIPMENTS ON RADIO ACCESS NETWORK APPARATUS

RELATED APPLICATION

This application claims priority to PCT Application No. PCT/EP2018/063486, filed on May 23, 2018, which is incorporated herein by reference in its entirety.

TECHNICAL FIELD

Some embodiments relate to a method of increasing the number of connected user equipments on an apparatus of a radio access network, e.g. a fifth generation new radio (5G NR) base station.

BACKGROUND

The number of users/devices that needs to be supported by the 5G system will increase at a rapid pace. The bare metal resources used for a DU of a radio access network (RAN) cannot scale at the same pace as the requirement for increase in "connected users". Operators would want to increase the number of users supported just by increasing cloud resources. Operators will not be interested to replace the bare-metal hardware used for DU quite often as it involves huge cost over-heads, given the large number of DU deployments all over.

SUMMARY

Hitherto, baseband processing in a radio access network (RAN) used to happen closer to cell site on custom bare-metal hardware. The resources (e.g. memory resources and processing resources) allocated/reserved were for the peak capacity and most of the times the resources were under-utilized.

To overcome this inefficient usage of resources and for various other benefits, cloudification and virtualization of RAN functions are proposed. However, not all RAN functions can be cloudified. 3GPP architecture for 5G RAN leans towards hosting real-time RAN functions on custom hardware closer to cell site (distributed unit (DU)) and non-real-time RAN functions on cloud (central unit (CU)). F1 interface is introduced in standards to facilitate the communication between CU and DU.

An important requirement on 5G is to support services like ultra-reliable low latency (URLLC), internet of things (IoT) and mobile broadband (MBB) with diverse service attributes (e.g. latency, throughput, etc.). There are user equipments (UEs) and IoT devices that are in 'active' state but not being currently scheduled. These still occupy or hold resources at DU limiting the number of users supported because of limited resources (e.g. memory resources and processing resources). With the ever-increasing number of mobile users and IoT devices, the 5G RAN has to support large number of connected users and IoT devices.

To achieve this, some optimizations are required for the functions hosted on the DU, preferably without replacing the hardware. Some embodiments introduce such optimization for a RAN packet scheduler. These optimizations can be extended to other functions of the DU. This disclosure can be used in 5G and long term evolution (LTE) implementations.

Some embodiments provide for apparatuses, methods and computer program products as defined in the appended claims.

In the following some embodiments will be described with reference to the accompanying drawings.

DESCRIPTION OF THE EMBODIMENTS

It is to be noted that the terms "UE", "User" and "IoT device" are used synonymously in this disclosure.

Further, UE context, referred to in this disclosure has at least the following types of information:
1. Channel quality
2. Bearers
3. Quality of Service (QoS)
4. Metrics/Scheduling
5. Buffer status
6. Throughput "Basic context" information referred to in this disclosure is UE information required to perform signaling when the UE is in active state but not currently being scheduled by a distributed unit (DU) for data transfer.

"Real-time" processing referred to in this disclosure is processing that needs to be completed within a specified time (deadline) in each transmission time interval (TTI). "Non-real-time processing referred to in this disclosure is scheduler related processing performed on a central unit (CU) for user equipments that are not being scheduled on DU.

Figure 1:
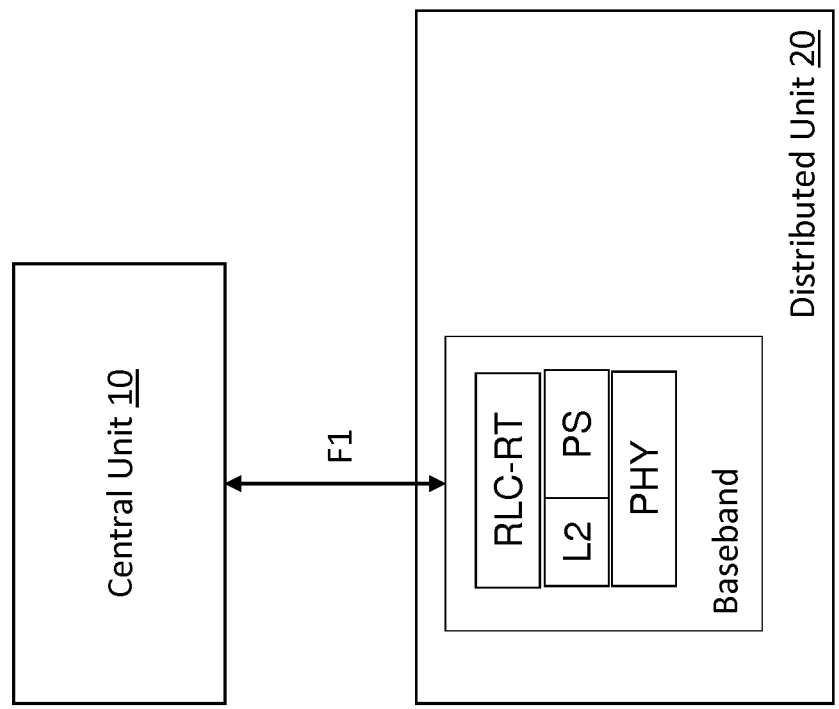
FIG. 1 shows a schematic block diagram illustrating an arrangement of a central unit and a distributed unit according to an embodiment.

FIG. 1 shows a schematic block diagram illustrating an arrangement of a central unit (CU) 10 and a distributed unit (DU) 20 according to an embodiment. According to an example implementation, the CU 10 is part of a cloud computing network. According to an example implementation, the CU 10 comprises a virtual processing unit.

The DU 20 is for baseband processing on the physical layer and L2 layer comprising packet scheduling (PS) and real time radio link control (RLC-RT) in an apparatus such as a base station (e.g. eNB, gNB) of a radio access network (RAN). According to an example implementation, the apparatus comprises hardware closer to cell site, configured to perform real-time radio access network functions, while the central unit is configured to perform non-real-time radio access network functions.

Let "N" be a total number of connected users (which are also referred to here as "first set of user equipments") and "M" be the maximum number of users that can be supported on the DU 20 (which are also referred to here as "second set of user equipments"), where M and N are positive integers. The DU 20 can store context information and process a maximum number M of users.

According to an embodiment, when UEs are attached to the RAN via the DU 20, their basic context information is stored both at the CU 10 and the DU 20.

Figure 2:
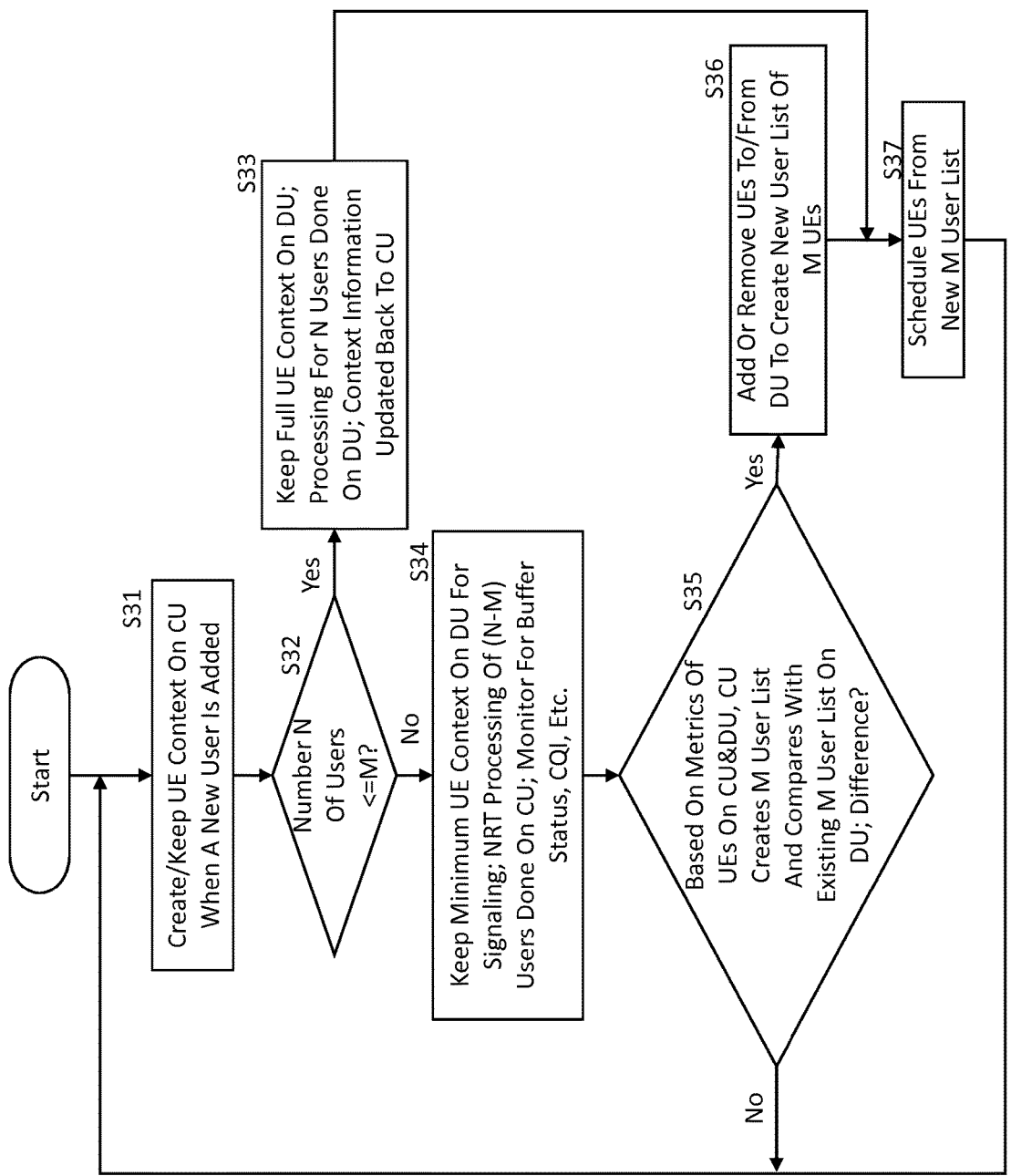
FIG. 2 shows a flowchart illustrating a method of optimizing usage of cloud resources according to an embodiment.

Referring to FIG. 2 showing a flowchart of a method according to an embodiment, in step S31 the CU 10 creates and keeps context information of a UE when the UE attaches to the radio access network via the DU 20.

In step S32 it is checked whether N<=M. If YES in S32, the process proceeds to S33 in which the CU 10 does not modify a user list. All of the processing (i.e. real-time and non-real-time processing) (e.g. PS processing) for these N users is done on DU 20. The context information of the N UEs is kept on DU 20, and context information is updated back to CU 10.

Otherwise, if NO in step S32, the process proceeds to step S34. In step S34, the non-real-time processing of UEs in excess of M (i.e. N-M) is performed by the CU 10, such as monitoring for buffer status, channel quality information (CQI), etc. The DU performs real-time processing for the M UEs. Minimum context information of the N-M UEs is kept on DU 20 for signaling. The N-M UEs are also referred to here as "third set of user equipments". The second set of M user equipments is contained within the first set, and the third set of N-M user equipments is contained within the first set but not contained within the second set.

In step S35, when any of these N-M UEs needs to be scheduled in S37, its context information is sent to DU 20 and is added to a list of M users which are handled by the DU 20. According to an example implementation, the list is processed by the CU 10. When any of these M UEs on the DU 20 does not have data to send or receive, the same are removed from the M user list and their current context information is updated back into CU 10.

According to an example embodiment, the DU 20 receives from the CU 10 information indicating the M UEs to be handled by the DU 20. This information may indicate at least one of the following: all the UEs of the list of M users (e.g. the UEs of the second set), the UEs newly added to the list of M users (e.g. the UEs newly added to the second set), the UEs removed from the list of M users (e.g. the UEs removed from the second set). The UEs may be indicated using their context information.

Swapping of users across CU 10 and DU 20 in S35 is described in more detail below.

All the N UEs (i.e. M users on DU 20 and N-M users on CU 10) are constantly monitored and their proportionally fair (PF) or delay-based metrics are calculated and stored in CU 10 and DU 20, respectively.

Periodically and/or on request by the DU 20, CU 10 gets the PF metric of UEs on DU 20 and sorts into a combined list to select a set of M users which are to be processed by the DU 20. Periodicity is set as small as possible but not to cause any performance impact on CU 10 or DU 20. Latency between CU 10 and DU 20 should be taken into consideration while determining the periodicity.

If the newly selected set of M users is same as the previous list of M users (previous M user list, e.g. the list of M users still existing on the DU 20) (NO in S35), the process of FIG. 2 returns to S31.

Otherwise, if YES in S35, the process proceeds to step S36 in which for those UEs that are newly added to the M user list, their context information is sent from CU 10 to DU 20 over an interface F1 connecting CU 10 and DU 20, as shown in FIG. 1. According to an example implementation, the F1 interface is used to communicate from the DU 20 to the CU 10 CQI report, PHY measurements and buffer status for UEs that are not part of the M user list, and to communicate from the CU 10 to the DU 20 a list of UEs along with their context information to be added or deleted from the M user list existing at the DU 20.

For those UEs from the DU 20 which could not be sorted into the new list of M users, in S36 their context information is updated back into CU 10 and their context information on DU 20 is deleted. According to an implementation example, the basic (e.g. minimum) context information of these UEs is kept on the DU 20. For example, for these UEs, the DU 20 deletes all context information except the basic context information.

In step S37 following steps S36 and S33, processing (e.g. packet scheduling for the new list of M users) is performed by the DU 20 for the UEs processed by the DU 20. From S37, the process returns to S31.

According to the process described above, it is ensured that the UE context information is transferred to DU 20 before it needs to be scheduled, and it is not necessary that it is stored on DU 20 all the time. This disclosure overcomes the limitation of resources on DU 20 and supports more number of users using the same available resources on the DU 20.

According to an embodiment, it is not necessary to store complete UE context information for all UEs at DU 20 all the time. The information is transferred over F1 interface into DU 20 from CU 10 when necessary and differing information is updated back to CU if not necessary. In LTE implementations, UE context information can be exchanged between DU and CU over proprietary interfaces, thus benefiting existing LTE deployments.

According to an embodiment, the number of users supported can be increased just by increasing the cloud resources, e.g. by allocating additional resources on demand.

According to an embodiment, more UEs and IoT devices can be supported without replacing the DU hardware.

According to an embodiment, the CU decides on which UEs to be on CU or DU based on the information it receives from the DU for all UEs over F1 interface.

According to an embodiment, non-real-time processing (CQI handling, buffer status, etc.) for UEs that are not on DU 20 are processed on CU 10 (e.g. cloud). DU 20 forwards these messages to edge-cloud/CU via F1 interface.

According to an embodiment, data for users that are not being scheduled on DU 20 is buffered at the CU 10 and sent to DU 20 just before considering for scheduling in DU 20.

According to an embodiment, in addition to M users, the DU 20 keeps minimal and essential context information (basic context information) of those UEs in excess of N-M UEs to facilitate control channel scheduling.

There may be a rare scenario where all of M users are active on DU 20 but CU 10 has to push some UEs onto DU for scheduling. In this scenario, according to an embodiment, some UEs from the M user list that have least priority/metrics are moved to CU 10 making way for UEs from CU 10 that need to be considered for scheduling.

According to an embodiment, up to a maximum of M UEs context information is always maintained at DU 20. Only when a total number N of UEs exceeds M, context information of some of those N-M UEs that need to be scheduled are transferred from CU 10 to DU 20 over F1.

Figure 3B:
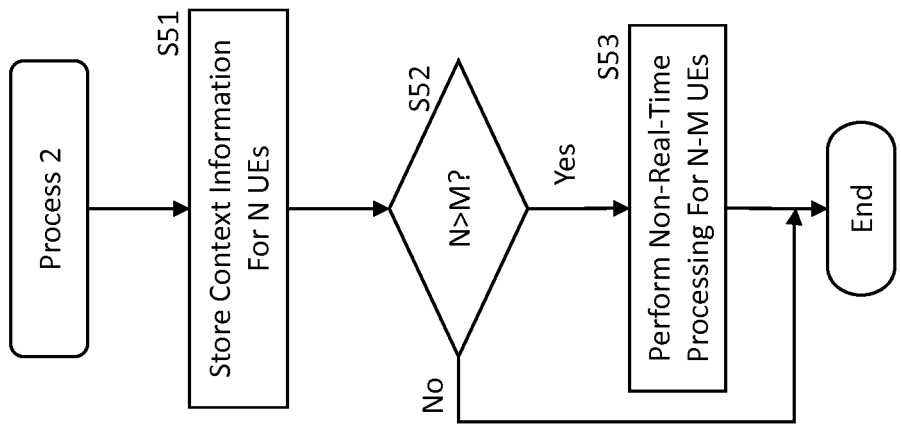
FIGS. 3A and 3B show flowcharts respectively illustrating processes of optimizing usage of cloud resources according to an embodiment.
Figure 3A:
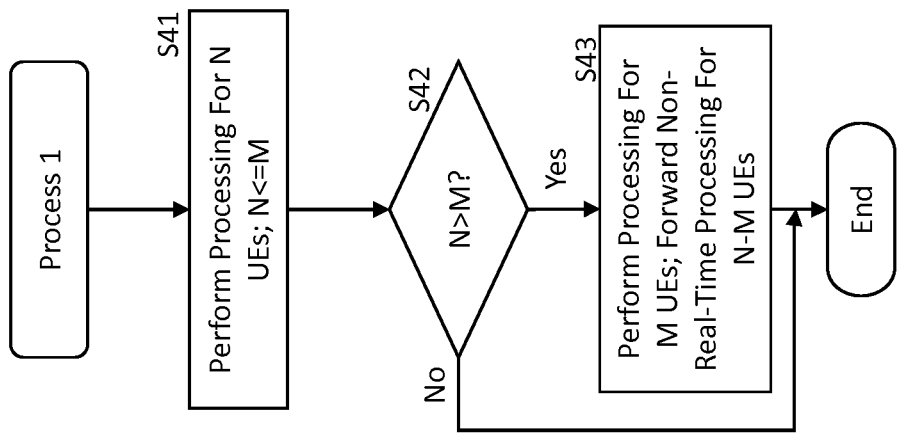

Now reference is made to FIGS. 3A and 3B showing flowcharts illustrating processes 1 and 2 according to an embodiment.

According to an example implementation, process 1 illustrated in FIG. 3A is performed by the DU 20, and process 2 illustrated in FIG. 3B is performed by the CU 10.

In step S41 of process 1, an apparatus (e.g. a base station) of a radio access network performs real-time and non-real-time processing for a first set of N user equipments attached to the radio access network via the apparatus, in case N does not exceed a maximum number M. M and N are positive integers.

In step S42 it is checked whether N exceeds M. If YES in S42, process 1 advances to S43, in which real-time and non-real-time processing is performed for a second set of M user equipments contained within the first set, and non-real-time processing of a third set of N-M user equipments contained within the first set but not contained within the second set is forwarded to a central unit (e.g. the CU 10). From S43 and if NO in S42, process 1 ends.

According to an example implementation, the apparatus comprises at least one processor and at least one memory including computer program code, the at least one memory and the computer program code configured to, with the at least one processor, cause the apparatus at least to perform the steps of process 1.

In step S51 of process 2, a central unit stores context information of a first set of N user equipments which are attached to a radio access network via an apparatus of the radio access network. N is a positive integer.

In step S52 it is checked whether N exceeds M. M is a positive integer. If YES in S52, process 2 advances to S53, in which non-real-time processing is performed for a third set of N-M user equipments of the N user equipments. Real-time and non-real-time processing for a second set of M user equipments is performed by the apparatus of the radio access network. From S53 and if NO in S52, process 2 ends.

According to an example implementation, the central unit comprising at least one processor and at least one memory including computer program code, the at least one memory and the computer program code configured to, with the at least one processor, cause the central unit at least to perform the steps of process 2.

Figure 4:
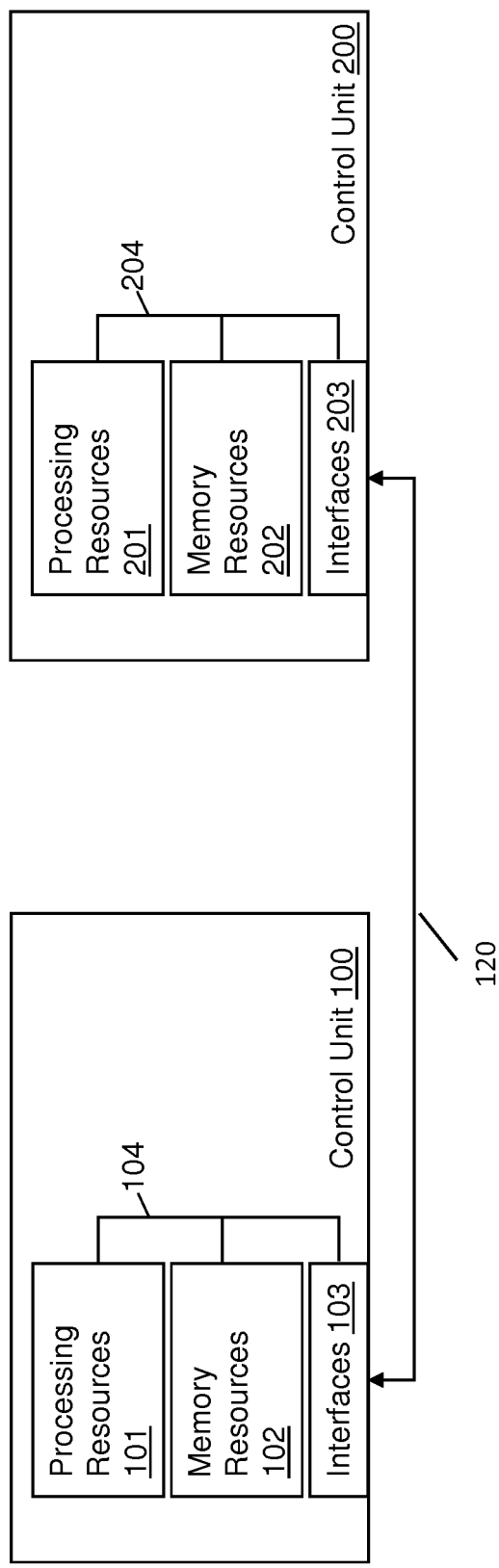
FIG. 4 shows a schematic block diagram illustrating a configuration of control units in which examples of embodiments are implementable.

Now reference is made to FIG. 4 for illustrating a simplified block diagram of various electronic devices that are suitable for use in practicing at least some of the above-described embodiments.

FIG. 4 shows a control unit 100 comprising processing resources (processing circuitry) 101, memory resources (memory circuitry) 102 and interfaces (interface circuitry) 103, coupled via connection 104. According to an example implementation, the control unit 100 is part of and/or is used by the central unit for performing process 2. According to an example implementation, the control unit 100 is part of and/or is used by the CU 10.

FIG. 4 also shows a control unit 200 comprising processing resources (processing circuitry) 201, memory resources (memory circuitry) 202 and interfaces (interface circuitry) 203, coupled via connection 204. According to an example implementation, the control unit 200 is part of and/or is used by the apparatus for performing process 1. According to an example implementation, the control unit 200 is part of and/or is used by the DU 20.

The control unit 100 is coupled to the control unit 200 using a connection 120. According to an example implementation, the connection 120 is the F1 interface.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

An example embodiment is implemented by computer software stored in the memory resources (memory circuitry) 102 and executable by the processing resources (processing circuitry) 101 of the control unit 100 and similar for the other memory resources (memory circuitry) 202 and the processing resources (processing circuitry) 201 of the control unit 200, or by hardware, or by a combination of software and/or firmware and hardware in any or all of the devices shown.

The memory resources (memory circuitry) 102, 202 may be of any type suitable to the local technical environment and may be implemented using any suitable data storage technology, such as semiconductor based memory devices, magnetic memory devices and systems, optical memory devices and systems, fixed memory and removable memory. The processing resources (processing circuitry) 101, 201 may be of any type suitable to the local technical environment, and may include one or more of general purpose computers, special purpose computers, microprocessors, digital signal processors (DSPs) and processors based on a multi core processor architecture, as non-limiting examples.

Further, as used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to an aspect of the disclosure, an apparatus of a radio access network is provided. According to an example embodiment, the apparatus performs process 1 of FIG. 3A. According to an example embodiment, the apparatus comprises control unit 200 of FIG. 4.

The apparatus comprises means for, in case a first set of N user equipments attached to the radio access network via the apparatus does not exceed a maximum number M, performing real-time and non-real-time processing for the N user equipments, M and N being positive integers, means for, in case N exceeds M, performing real-time and non-real-time processing for a second set of M user equipments contained within the first set and forwarding non-real-time processing of a third set of N-M user equipments contained within the first set but not contained within the second set to a central unit.

According to an example implementation, the apparatus further comprises means for receiving, from the central unit, information indicating the M user equipments of the second set.

According to an example implementation, the apparatus further comprises means for, for the user equipments excluded from the second set, deleting all context information except basic context information, and means for updating back to the central unit context information of the user equipments excluded from the second set.

According to an example implementation, the apparatus further comprises means for receiving, from the central unit, context information of user equipments newly included to the second set, and means for storing the context information.

According to an example implementation, the apparatus further comprises means for communicating, to the central unit, for the N-M user equipments of the third set, at least one of a channel quality information report, physical layer measurements, and buffer status.

According to an example implementation, the apparatus further comprises means for communicating to the central unit context information of user equipments that are excluded from the second set, the context information including at least one of UE buffer status, throughput and scheduling metric information.

According to an example implementation, the apparatus further comprises means for sending proportionally fair metric information of the user equipments of the second set to the central unit periodically and/or when requested by the central unit.

According to an example implementation,
the apparatus comprises hardware closer to cell site, configured to perform real-time and non-real-time radio access network functions; and/or
the central unit is configured to perform non-real-time radio access network functions; and/or
the means for forwarding the non-real-time processing for the N-M user equipments of the third set to the central unit uses an F1 interface between the apparatus and the central unit; and/or
the means for communicating uses the F1 interface; and/or
the means for updating uses the F1 interface between the apparatus and the central unit; and/or
the means for sending uses the F1 interface between the apparatus and the central unit.

According to another aspect of the disclosure, a central unit is provided.

According to an example embodiment, the central unit performs process 2 of FIG. 3B. According to an example embodiment, the apparatus comprises control unit 100 of FIG. 4.

The central unit comprises means for storing context information of a first set of N user equipments which are attached to a radio access network via an apparatus of the radio access network, N being a positive integer, and means for, in case the N user equipments exceed a maximum number M, M being a positive integer, performing non-real-time processing for a third set of N-M user equipments contained within the first set, whereas both real-time and non-real-time processing for a second set of M user equipments contained within the first set but not contained within the third set is performed by the apparatus.

According to an example implementation, the central unit comprises means for sending, to the apparatus, information indicating the M user equipments of the second set. According to an example implementation, this information is information indicating newly included user equipments to the second set.

According to an example implementation, the central unit comprises means for selecting, for the third set, user equipments from the N user equipments based on at least one of priority and metrics of the N user equipments.

According to an example implementation, the central unit comprises means for monitoring the N-M user equipments of the third set, means for acquiring information on the M user equipments of the second set processed by the apparatus, means for assigning each of the N user equipments of the first set to one of the third set and the second set based on the information, means for, in case the M user equipments assigned to the second set do not correspond to the M user equipments of the second set processed by the apparatus before the assigning, sending, to the apparatus, context information of user equipments of the second set that do not correspond to user equipments of the second set before the assigning, which exists at the apparatus, means for informing the apparatus about user equipments to be excluded from the second set existing at the apparatus, and means for updating context information of the user equipments to be excluded from the second set existing at the apparatus, which are assigned to the third set and do not correspond to user equipments of the third set before the assigning.

According to an example implementation, the means for assigning comprises at least one of performing the assigning periodically and/or when requested by the apparatus, and assigning each of the N user equipments to one of the third set and the second set based on at least one of priority and metrics of the N user equipments.

According to an example implementation, the central unit comprises means for receiving, from the apparatus, for the N-M user equipments of the third set, at least one of a channel quality information report, physical layer measurements, and buffer status.

According to an example implementation, the central unit comprises means for communicating to the apparatus context information of user equipments newly included to the second set, the context information including at least one of bearer information, channel quality information and quality of service requirements at user equipment and bearer level.

According to an example implementation,
the central unit is configured to perform non-real-time radio access network functions; and/or
the apparatus comprises hardware closer to cell site, configured to perform real-time and non-real-time radio access network functions; and/or
the means for acquiring uses an F1 interface between the apparatus and the central unit; and/or
the means for sending uses the F1 interface; and/or
the means for informing uses the F1 interface; and/or
the means for receiving uses the F1 interface.

It is to be understood that the above description is illustrative of the disclosure and is not to be construed as limiting the disclosure. Various modifications and applications may occur to those skilled in the art without departing from the true spirit and scope of the disclosure as defined by the appended claims.

The invention claimed is:

1. An apparatus of a radio access network, the apparatus comprising
    at least one processor and
    at least one memory including computer program code, the at least one memory and the computer program code configured to, with the at least one processor, cause the apparatus at least to perform:
    in case a first set of user equipment comprising N user equipments attached to the radio access network via the apparatus does not exceed a maximum number M, performing real-time and non-real-time processing for the N user equipments, M and N being positive integers;
    in case N exceeds M, performing real-time and non-real-time processing for a second set of user equipment comprising N-M user equipments of the N user equipment that exceed the maximum number M contained within the first set and forwarding non-real-time processing of a third set of user equipment comprising N-M user equipments contained within the first set but not contained within the second set to a central unit.

2. The apparatus of claim 1, wherein the at least one memory and the computer program code are configured to, with the at least one processor, cause the apparatus to further perform: receiving, from the central unit, information indicating the M user equipments of the second set.

3. The apparatus of claim 1, wherein the at least one memory and the computer program code are configured to, with the at least one processor, cause the apparatus to further perform: for the user equipments excluded from the second set, deleting all context information except basic context information; and updating back to the central unit context information of the user equipments excluded from the second set.

4. The apparatus of claim 1, wherein the at least one memory and the computer program code are configured to, with the at least one processor, cause the apparatus to further perform: receiving, from the central unit, context information of user equipments newly included to the second set; and storing the context information.

5. The apparatus of claim 1, wherein the at least one memory and the computer program code are configured to, with the at least one processor, cause the apparatus to further perform: communicating, to the central unit, for the N-M user equipments of the third set, at least one of a channel quality information report, physical layer measurements, and buffer status.

6. The apparatus of claim 1, wherein the at least one memory and the computer program code are configured to, with the at least one processor, cause the apparatus to further perform: communicating to the central unit context information of user equipments that are excluded from the second set, the context information including at least one of UE buffer status, throughput and scheduling metric information.

7. The apparatus of claim 1, wherein the at least one memory and the computer program code are configured to, with the at least one processor, cause the apparatus to further perform: sending proportionally fair metric information of the user equipments of the second set to the central unit periodically and/or when requested by the central unit.

8. The apparatus of claim 1, wherein the apparatus comprises hardware closer to cell site, configured to perform real-time and non-real-time radio access network functions; and/or the central unit is configured to perform non-real-time radio access network functions; and/or the forwarding the non-real-time processing for the N-M user equipments of the third set to the central unit comprises communication via an F1 interface between the apparatus and the central unit; and/or the communicating comprises communication via the F1 interface; and/or the updating back to the central unit the context information of the user equipments that are excluded from the second set comprises communication via the F1 interface between the apparatus and the central unit; and/or the sending proportionally fair metric information of the user equipments of the second set to the central unit periodically and/or when requested by the central unit comprises communication via the F1 interface between the apparatus and the central unit.

9. A central unit comprising
    at least one processor; and
    at least one memory including computer program code, the at least one memory and the computer program code configured to, with the at least one processor, cause the central unit at least to perform:
    storing context information of a first set of user equipment comprising N user equipments which are attached to a radio access network via an apparatus of the radio access network, N being a positive integer;
    in case the N user equipments exceed a maximum number M, M being a positive integer, performing real-time and non-real-time processing for a third set of user equipment comprising N-M user equipments from the user equipment contained within the first set that exceed the maximum number M,
    whereas both the real-time and non-real-time processing for a second set of the M user equipments contained within the first set but not contained within the third set is performed by the apparatus.

10. The central unit of claim 9, wherein the at least one memory and the computer program code are configured to, with the at least one processor, cause the central unit to further perform: sending, to the apparatus, information indicating the M user equipments of the second set.

11. The central unit of claim 9, wherein the at least one memory and the computer program code are configured to, with the at least one processor, cause the central unit to further perform: selecting, for the third set, user equipments from the N user equipments based on at least one of priority and metrics of the N user equipments.

12. The central unit of claim 9, wherein the at least one memory and the computer program code are configured to, with the at least one processor, cause the central unit to further perform:
    monitoring the N-M user equipments of the third set; acquiring information on the M user equipments of the second set processed by the apparatus;
    assigning each of the N user equipments of the first set to one of the third set and the second set based on the information; in case the M user equipments assigned to the second set do not correspond to the M user equipments of the second set processed by the apparatus before the assigning,
    sending, to the apparatus, context information of user equipments of the second set that do not correspond to user equipments of the second set before the assigning, which exists at the apparatus,
    informing the apparatus about user equipments to be excluded from the second set existing at the apparatus, and
    updating context information of the user equipments to be excluded from the second set existing at the apparatus, which are assigned to the third set and do not correspond to user equipments of the third set before the assigning.

13. The central unit of claim 12, wherein the assigning comprises at least one of: performing the assigning periodically and/or when requested by the apparatus; assigning each of the N user equipments to one of the third set and the second set based on at least one of priority and metrics of the N user equipments.

14. The central unit of claim 9, wherein the at least one memory and the computer program code are configured to, with the at least one processor, cause the central unit to further perform: receiving, from the apparatus, for the N-M user equipments of the third set, at least one of a channel quality information report, physical layer measurements, and buffer status.

15. The central unit of claim 12, wherein the at least one memory and the computer program code are configured to, with the at least one processor, cause the central unit to further perform: communicating to the apparatus context information of user equipments newly included to the second set, the context information including at least one of bearer information, channel quality information and quality of service requirements at the user equipment and bearer level.

16. The central unit of claim 9, wherein the central unit is configured to perform non-real-time radio access network functions; and/or the apparatus comprises hardware closer to cell site, configured to perform real-time and non-real-time radio access network functions; and/or the acquiring information comprises communication via an F1 interface between the apparatus and the central unit; and/or the sending of the context information comprises communication via the F1 interface; and/or the information indicating the M user equipments of the second set is information indicating newly included user equipments to the second set; and/or the sending the information comprises communication via the F1 interface; and/or the informing the apparatus comprises communication via the F1 interface; and/or the receiving from the apparatus comprises communication via the F1 interface.

17. A method for use by an apparatus of a radio access network, the method comprising:
  in case a first set of user equipment comprising N user equipments attached to the radio access network via the apparatus does not exceed a maximum number M, performing real-time and non-real-time processing for the N user equipments, M and N being positive integers;
  in case N exceeds M, performing real-time and non-real-time processing for a second set of user equipment comprising N-M user equipments that exceed the maximum number M contained within the first set and forwarding non-real-time processing of a third set of user equipment comprising N-M user equipments from the user equipment contained within the first set but not contained within the second set to a central unit.

18. The method of claim 17, further comprising: receiving, from the central unit, information indicating the M user equipments of the second set.

19. The method of claim 17, further comprising: for the user equipments excluded from the second set, deleting all context information except basic context information; and updating back to the central unit context information of the user equipments excluded from the second set.

20. The method of claim 17, further comprising: receiving, from the central unit, context information of user equipments newly included to the second set; and storing the context information.

* * * * *